Aug. 20, 1963 J. K. GOSSLAND 3,101,454

TRANSISTOR R-C OSCILLATOR

Filed July 11, 1960

INVENTOR.

JOHN K. GOSSLAND

BY Zalwider Mattingly & Huntley

Attorneys

United States Patent Office 3,101,454

Patented Aug. 20, 1963

3,101,454

TRANSISTOR R-C OSCILLATOR

John K. Gossland, Altadena, Calif., assignor to Technical Oil Tool Corporation, Los Angeles, Calif., a corporation of California Filed July 11, 1960, Ser. No. 42,055
12 Claims. (Cl. 331—111)

This invention relates to electrical control circuitry. More particularly, this invention relates to a solid state circuit adapted to control the operation of intermittently actuated elements; for instance, the control circiut may be a flasher circuit controlling the operation of lamps such as aircraft warning lights, or the like.

It is today common practice to provide vehicles such as aircraft with a group of wing and tail warning lights which are operated from a 28 volt D.C. supply voltage and which are switched on and off at a predetermined rate under the control of a flasher circuit. It is, for example, common to operate such a flasher circuit so that the lamps are flashed at a rate corresponding to 2½ periods on for each one period off with a total of 85 flashes per minute.

Since the lamps used are generally of the incandescent type, the load resistance will be low when the lamps are cold and high when the lamps are hot. The flasher circuit is operated by the same power supply which actuates the load and must be capable of functioning at a fixed predetermined switching rate independently of supply voltage variation resulting from load variation.

It is also preferable that the flasher circuit be temperature stabilized and that it be a passive system whereby when it is inserted in series with the D.C. supply voltage to the lamps it will automatically operate without external control or synchronization. The circuit should also be fail-safe in the sense that if any temporary short is placed on the load sufficient to destroy the flasher circuit, a shorted condition will result therein in such a fashion that the lamps controlled by the circuit will remain constantly lighted.

It is, therefore, an object of this invention to provide a control circuit having the above desirable characteristics.

It is a further object of this invention to provide a flasher circuit including lightweight solid state components which circuit is also stable in its operation over a relatively wide temperature range.

It is yet another object of this invention to provide such a flasher circuit which is reliable and efficient in operation and which includes a fail-safe feature such that a shorted load will eliminate the switching and leave the controlled elements in their on or functioning state.

It is another object of this invention to provide such a flasher circuit utilizing complementary types of transistors, including temperature stabilization and load decoupling from the timing control, and adapted to accommodate relatively high power loads of as much as 100 to 200 watts.

It is a still further object of this invention to provide a solid state electronic switch for controlling the on-off time and flashing rate of electrically operated elements such as aircraft warning wing-tip, nose and tail warning lamps, or the like.

Other objects, features, and advantages of the present invention will be more fully apparent to those skilled in the art from the following detailed description taken in connection with the accompanying drawing wherein.

Figure 1:
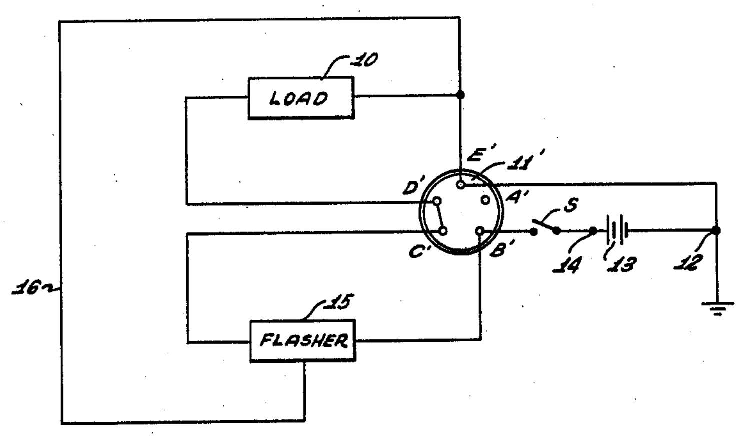
FIGURE 1 is a block diagram of a typical circuit in which the flasher of the present invention may be used.

Turning now to the drawing, there is shown in FIGURE 1 a circuit block diagram wherein a load 10, such as a bank of warning lights on an aircraft, is connected through a terminal E′ of a plug 11′ to the grounded output electrode 12 of a direct current voltage source 13. Of course, it will be understood that the voltage source 13 may be either a battery as shown by way of example or any other suitable D.C. power supply.

The positive output terminal 14 of the D.C. supply 13 is connected through on-off switch S and terminal B′ of the plug 11′ to the input supply circuit of the flasher 15. As will be seen in greater detail below, the flasher circuit 15 is essentially a switch which automatically opens and closes at a predetermined rate so as to connect the positive side of the voltage supply 13 intermittently through the plug terminal B′, the flasher 15, and plug terminals C′ and D′, to and through the load 10 and thence back through terminal E′ of the plug 11′ to the negative (grounded) side of power supply 13. Thus, when the flasher 15 is in the closed switch or conductive state, the load is energized and the lights are operative. On the other hand, when the flasher circuit 15 is nonconductive, its open circuit condition prevents energization of the load 10. As will be noted, the flasher circuit 15 is itself connected by wire 16 to a common ground to which the negative terminal 12 of voltage supply 13 is also connected.

Figure 2:
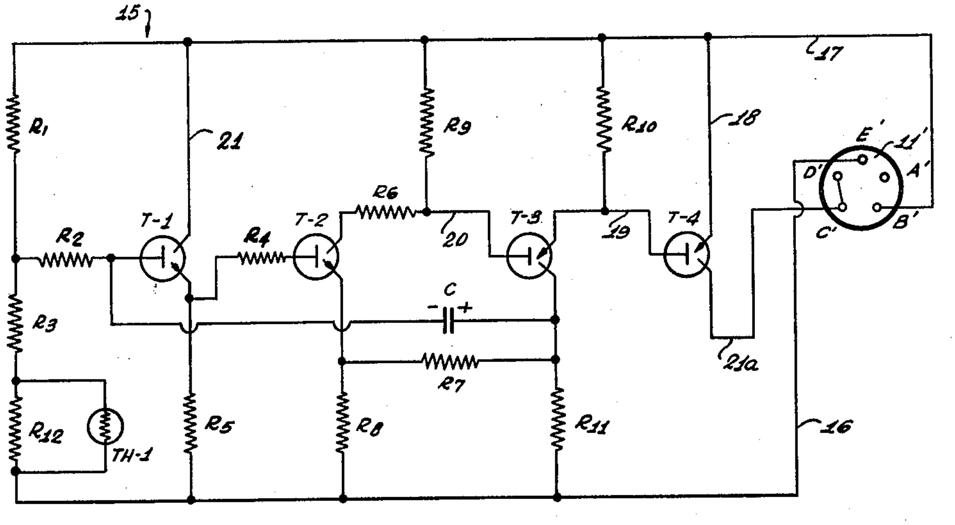
FIGURE 2 is a detailed circuit diagram of the flasher shown in FIGURE 1.

The details of the flasher circuit are shown in the circuit diagram of FIGURE 2. As was noted above, the circuit is intended to function primarily as a solid state electronic switch controlling the on-off time and flashing rate of a load such as aircraft warning wing-tip, nose, and tail warning lamps. Consequently, the overall objectives to be achieved by the circuit are reliability, low cost, small size, light weight, and long life. Since cost is an important factor, it is preferred to use germanium transistors in the circuit. This in turn requires that measures be taken to compensate for the undesirable temperature characteristics of germanium, particularly within the environmental temperatures extremes of approximately −55° F. to +160° F.

A preferred embodiment of the circuit, as shown in FIGURE 2, can, for example, comprise four stages or sections each section containing a single transistor. Thus, the transistor T–1 may conveniently be an NPN transistor used in the basic timing section. The transistor T–2 is a current amplifier and is also conveniently an NPN transistor. The transistor T–3 is a current amplifier driver and is preferably a PNP transistor and more generally, it is preferably opposite in type to the transistor T–2. The transistor T–4 is the switching unit through which actual load current flows and is preferably a PNP type power transistor.

The circuit details of the manner of interconnection of these four transistors will first be described before discussing the detailed operation of the circuit. In particular, it will be noted that wire 17 is connected to the terminal B′ and, therefore, to the positive or high side of the D.C. voltage source 13 and is thus the positive supply lead for the circuit. It is connected through a voltage divider comprising series connected resistors R1, R3, and R12 to grounded wire 16 which leads through terminal E′ back to grounded terminal 12 of power supply 13.

Wire 21 directly connects the collector of timing transistor T–1 to positive lead 17, while the emitter is connected through resistor R–5 to ground 16. The positive lead 17 is, as noted above, connected through the series voltage divider consisting of resistors R–1, R–3, and R–12 to the lead 16 which is connected to grounded terminal E′ of plug 11′. A thermistor TH–1 is connected in parallel with resistor R–12 to afford temperature compensation thereof.

A resistor R–2 is connected from the junction point of resistors R–1 and R–3 to the base electrode of transistor T–1. This base electrode of transistor T–1 is also connected through capacitor C to the collector of transistor T–3.

The emitter of transistor T–1 is connected through resistor R–4 to the base electrode of transistor T–2 to supply a timing signal to be amplified by T–2 and T–3 to control T–4.

The collector of transistor T–2 is connected through the series combination of resistors R–6 and R–9 to the positive lead 17. The junction point of resistors R–6 and R–9 is in turn connected to the base electrode of transistor T–3 by wire 20. The emitter of this first stage current amplifier is connected by resistor R–8 to ground 16.

The emitter of transistor T–2, which is connected through resistor R–8 to the ground lead 16, is also connected through stabilizing feedback resistor R–7 to the collector of transistor T–3 which is also connected through load resistor R–11 to the ground lead 16. Resistor R–11, as will be explained below, acts to decouple the timing circuit from the power circuit load so that changes in load impedance will not affect the flashing rate. Essentially, this result follows from the fact that R–11 provides an independent fixed collector load for transistor T–3.

The emitter of current amplifier transistor T–3 is connected through resistor R–10 to the positive supply lead 17 and its collector is connected through resistor R–11 to grounded wire 16. The emitter of transistor T–3 is also directly connected to the base electrode of transistor T–4 by wire 19 to supply a control bias for T–4.

A wire 18 is connected from positive supply lead 17 to the emitter of transistor T–4, the collector of which is connected by wire 21*a* to terminals C′ and D′ of switch 11′ to form the load control path. That is, the emitter collector circuit of T–4 is in series between the power supply and the load so that the load is actuated only when T–4 is conductive.

The transistor T–1 is connected in an emitter follower circuit, transistor T–2 is connected in a common emitter amplifier circuit, and transistor T–3 is connected in a common collector amplifier circuit. T–1 has a base input, and an emitter output connected to the base input of T–2. The collector or driver output of T–2 is connected to the base input of T–3, and the emitter or driver output of T–3 is connected to the base input of T–4. Transistor T–3 also has a collector control output connected to an emitter control output of transistor T–4 by the stabilizing feedback resistor R–7.

Briefly, the circuit operation is such that the bias voltage applied over wire 19 to the base electrode of transistor T–4 renders the emitter collector circuit of this transistor alternately conductive and non-conductive so as to alternately make and break a circuit from the voltage supply 13 through terminal B′, wires 17 and 18, the emitter-collector circuit of transistor T–4, wire 21*a* and terminals C′, D′ to load 10 and thence back through terminal E′ to the grounded side of the voltage supply. That is to say, the transistor T–4 functions as a switching transistor under the control of the bias voltage applied to its base electrode over wire 19 to control the flashing rate of a load connected between terminals D′ and E′.

In greater detail, the operation of the circuit is as follows. When the D.C. power supply is connected to terminal B′ of the plug 11′, the timing sequence is initiated. Since no bias voltages have been developed for the transistors before the voltage is so applied, current initially flows through transistors T–3 and T–4 (which are conductive with zero bias on their base electrode) and immediately lights the lamps or otherwise energizes whatever load may be connected to the circuit. Simultaneously, a positive bias is applied to the base of T–1 through resistor R–2 so that T–1 conducts. The positive voltage across resistor R–5 is applied to the base of transistor T–2, causing it to conduct. The voltages provided to the bases of T–3 and T–4 are dropped and conduction thereof continues.

In a particular preferred embodiment of this circuit for which specific circuit parameters and component values will be indicated in detail below, a 28 volt D.C. source is used as the power supply 13. Assuming this voltage value for purposes of discussion, it will be seen that the current flowing through transistor T–3 develops nearly a 28 volt drop across resistor R–11 which is large by comparison to R–10. This voltage transient is transmitted through the capacitor C to the base electrode of transistor T–1.

This 28 volt transient drives the conducting transistor T–1 further into conduction. When transistor T–1 is conductive, transistor T–2 is similarly conductive. Thus, timing transistor T–1 is initially conductive while the lamps are on. As soon as the transistor T–3 is conductive, however, the capacitor C begins to charge. The capacitor C charges through resistor R–2, the applied voltage being the difference between the voltage at the collector of T–3 and the voltage at the divider tap which is common to R–1, R–2, and R–3.

The RC time constant of this circuit determines the on time of the load lamps. This time constant can be computed by methods well known in the art. As capacitor C charges, the voltage at the base of T–1 decays at an exponential rate. When the voltage reaches a cut-off point (approximately +10 volts, for example), the transistor T–1 is rendered non-conductive. The point at which this occurs, of course, depends upon the bias characteristics of the transistor T–1 and the interacting control effect of other circuit components involved during the charging of capacitor C.

When T–1 is rendered non-conductive, T–2, T–3 and T–4 are rendered non-conductive and the lamps are turned off. Thus, the loss of voltage appearing across resistor R–5 as a result of the non-conduction of transistor T–1 cuts off the transistor T–2 and the voltage at the collector of transistor T–2 is transmitted to the base of transistor T–3 as a positive voltage. Since transistor T–3 is a PNP transistor, this positive going voltage in turn cuts off T–3. The resulting positive going voltage at the emitter of transistor T–3 is directly connected to the base of transistor T–4 thereby cutting it off and rendering the supply circuit to the load non-conductive.

T–1 is non-conductive during the time that T–3 and T–4 are non-conductive. When T–3 is cut off, however, its collector goes to ground and capacitor C immediately begins to discharge. This results in a progressively smaller negative voltage at the base of T–1 until after an interval the magnitude of which is regulated by the time constant of capacitor C and resistor R–2, a voltage (approximately 0 volts, for example) is reached when T–1 conducts. Increasingly the magnitude of either R–2 or C increases the off time whereas decreasing these magnitudes decreases the off time.

Once T–1 conducts, T–2, T–3 and T–4 also conduct, and C again begins to charge as described above. The above cycle of operations, of course, repeats indefinitely. As noted above, it is common to provide for a frequency of 85 flashes per minute with an "on time" for each flash which is 2½ times as long as the intervening "off time."

The feed-back circuit between the collector of transistor T–3 and the emitter of transistor T–2 comprising the resistor R–7 is inserted for stabilization. Thermistor TH–1 is inserted as a negative temperature coefficient device to reduce the value of R–12 at high temperatures and to increase this value at low temperatures. This serves to stabilize the variation in on time which normally would change in magnitude due to the variation in leakage current in transistor T–1 caused by temperature excursions.

As noted above, the resistor R–11 functions to decouple the power circuit load from the timing control circuit by providing amplifier transistor T–3 with a fixed independent load so as to prevent a variation in the magnitude of the load of from one to five lamps from changing the period of the flash rate. That is to say, the decoupling resistor R–11 permits the flasher control circuit to be operated from a power source which also supplies loads of variable impedance magnitude without affecting the timing function of the control circuit. A change in supply voltage does not cause a change in frequency of oscillation since R–11 is connected from T–3 to ground rather than to the collector of T–4.

A preferred exemplary embodiment of the circuit performs these functions in such a way as to accommodate relatively high power loads of 100 to 200 watts. In this particular exemplary embodiment of the invention, the components and their values were as follows:

NPN transistor T–1 was a type 2N365;
NPN transistor T–2 was a type 2N365;
PNP transistor T–3 was a type 2N1172;
PNP transistor T–4 was a type 2N628;
Voltage source 13 was a 28 volt direct current supply;
Capacitor C was a 40 volt, 30 microfarad capacitor;
Thermistor TH–1 had a room temperature value of 3.5 kilohms.

The resistors had the following values: R–1, 6.8 kilohms; R–2, 3.3 kilohms; R–3, 3.3 kilohms; R–4, 560 ohms; R–5, 4.7 kilohms; R–6, 560 ohms; R–7, 510 ohms; R–8, 240 ohms; R–9, 150 ohms; R–10, 18 ohms; R–11, 150 ohms (2 watts); R–12, 1 kilohm; all resistors except R–11 were ½ watt.

While a particular exemplary preferred embodiment of the invention has been described in detail above, it will be understood that modifications and variations therein may be effected without departing from the true spirit and scope of the novel concepts of the present invention as defined by the following claims.

I claim:

1. In a flasher circuit, oscillator means comprising: a voltage divider; a first transistor connected in an emitter follower circuit and having an input and an output; means connecting a point on said voltage divider to the input of said emitter follower circuit for biasing the same; a second transistor connected in a common emitter amplifier circuit and having an input and an output; means connecting the output of said emitter follower circuit to the input of said common emitter amplifier circuit; a third transistor connected in a common collector amplifier circuit and having an input, a driver output, and a control output; means connecting the output of said common emitter amplifier circuit to the input of said common collector amplifier circuit; and means including a capacitor connecting the control output of said common collector amplifier circuit to the input of said emitter follower circuit whereby oscillation occurs and a signal in the driver output of said common collector amplifier circuit is varied at a periodic rate.

2. In a flasher circuit, oscillator means comprising: a voltage divider; a first transistor connected in an emitter follower circuit and having an input and an output; means connecting a point of said voltage divider to the input of said emitter follower circuit for biasing the same; a thermistor connected to said voltage divider for varying bias to the input of said emitter follower circuit in accordance with temperature variations; a second transistor connected in a common emitter amplifier circuit and having an input and an output; means connecting the output of said emitter follower circuit to the input of said common emitter amplifier circuit; a third transistor connected in a common collector amplifier circuit and having an input, a driver output, and a control output; means connecting the output of said common emitter amplifier circuit to the input of said common collector amplifier circuit; and a capacitor connecting the control output of said common collector amplifier circuit to the input of said emitter follower circuit whereby oscillation occurs and a signal in the driver output of said common collector amplifier circuit is varied at a periodic rate.

3. In a flasher circuit, oscillator means comprising: a voltage divider; a first transistor connected in an emitter follower circuit and having an input and an output; means connecting a point on said voltage divider to the input of said emitter follower circuit for biasing the same; a second transistor connected in a common emitter amplifier circuit and having an input, a driver output, and a control output; means connecting the output of said emitter follower circuit to the input of said common emitter amplifier circuit; a third transistor connected in a common collector amplifier circuit and having an input, a driver output, and a control output; means connecting the output of said common emitter amplifier circuit to the input of said common collector amplifier circuit; feedback means connecting the control output of said common collector amplifier circuit to the control output of said common emitter amplifier circuit; and a capacitor connecting the control output of said common collector amplifier circuit to the input of said emitter follower circuit whereby oscillation occurs and a signal in the driver output of said common collector amplifier circuit is varied at a periodic rate.

4. In a flasher circuit, oscillator means comprising: a voltage divider; a first transistor connected in an emitter follower circuit and having an input and an output; means connecting a point on said voltage divider to the input of said emitter follower circuit for biasing the same; a thermistor connected to said voltage divider for varying bias to the input of said emitter follower circuit in accordance with temperature variations; a second transistor connected in a common emitter amplifier circuit and having an input, a driver output, and a control output; means connecting the output of said emitter follower circuit to the input of said common emitter amplifier circuit; a third transistor connected in a common collector amplifier circuit and having an input, a driver output, and a control output; means connecting the driver output of said common emitter amplifier circuit to the input of said common collector amplifier circuit; feedback means comprising a resistor connecting the control output of said common collector amplifier circuit to the control output of said common emitter amplifier circuit; and a capacitor connecting the control output of said common collector amplifier circuit to the input of said emitter follower circuit whereby oscillation occurs and a signal in the driver output of said common collector amplifier circuit is varied at a periodic rate.

5. A flasher circuit for controlling power from a power source to a load at a predetermined periodic rate, comprising: oscillator means including a voltage divider, a first transistor connected in an emitter follower circuit and having an input and an output, means connecting a point on said voltage divider to the input of said emitter follower circuit for biasing the same, a second transistor connected in a common emitter amplifier circuit and having an input and an output, means connecting the output of said emitter follower circuit to the input of said common emitter amplifier circuit, a third transistor connected in a common collector amplifier circuit and having an input, a driver output, and a control output, means connecting the output of said common emitter amplifier circuit to the input of said common collector amplifier circuit, and a capacitor connecting the control output of said common collector amplifier circuit to the input of said emitter follower circuit whereby oscillation occurs and a signal in the driver output of said common collector amplifier circuit is varied at a periodic rate;

and means responsive to the variations of said signal for applying power to a load at said periodic rate.

6. A flasher circuit for controlling power from a power source to a load at a predetermined periodic rate, comprising: oscillator means including a voltage divider, a first transistor connected in an emitter follower circuit and having an input and an output, means connecting a point on said voltage divider to the input of said emitter follower circuit for biasing the same, a thermistor connected to said voltage divider for varying bias to the input of said emitter follower circuit in accordance with temperature variations, a second transistor connected in a common emitter amplifier circuit and having an input and an output, means connecting the output of said emitter follower circuit to the input of said common emitter amplifier circuit, a third transistor connected in a common collector amplifier circuit and having an input, a driver output, and a control output, means connecting the output of said common emitter amplifier circuit to the input of said common collector amplifier circuit, and a capacitor connecting the control output of said common collector amplifier circuit to the input of said emitter follower circuit whereby oscillation occurs and a signal in the driver output of said common collector amplifier circuit is varied at a periodic rate; and means responsive to the variations of said signal for applying power to a load at said periodic rate.

7. A flasher circuit for controlling power from a power source to a load at a predetermined periodic rate, comprising: oscillator means including a voltage divider, a first transistor connected in an emitter follower circuit and having an input and an output, means connecting a point on said voltage divider to the input of said emitter follower circuit for biasing the same, a second transistor connected in a common emitter amplifier circuit and having an input, a driver output, and a control output, means connecting the output of said emitter follower circuit to the input of said common emitter amplifier circuit, a third transistor connected in a common collector amplifier circuit and having an input, a driver output, and a control output, means connecting the driver output of said common emitter amplifier circuit to the input of said common collector amplifier circuit, feedback means connecting the control output of said common collector amplifier circuit to the control output of said common emitter amplifier circuit, and a capacitor connecting the control output of said common collector amplifier circuit to the input of said emitter follower circuit whereby oscillation occurs and a signal in the driver output of said common collector amplifier circuit is varied at a periodic rate; and means responsive to the variations of said signal for applying power to a load at said periodic rate.

8. A flasher circuit for controlling power from a power source to a load at a predetermined periodic rate, comprising: oscillator means including a voltage divider, a first transistor connected in an emitter follower circuit and having an input and an output, means connecting a point on said voltage divider to the input of said emitter follower circuit for biasing the same, a thermistor connected to said voltage divider for varying bias to the input of said emitter follower circuit in accordance with temperature variations, a second transistor connected in a common emitter amplifier circuit and having an input, a driver output, and a control output, means connecting the output of said emitter follower circuit to the input of said common emitter amplifier circuit, a third transistor connected in a common collector amplifier circuit and having an input, a driver output, and a control output, means connecting the driver output of said common emitter amplifier circuit to the input of said common collector amplifier circuit, feedback means comprising a resistor connecting the control output of said common collector amplifier circuit to the control output of said common emitter amplifier circuit, and a capacitor connecting the control output of said common collector amplifier circuit to the input of said emitter follower circuit whereby oscillation occurs and a signal in the driver output of said common collector amplifier circuit is varied at a periodic rate; and a switching transistor responsive to the variations of said signal for applying power to a load at said periodic rate.

9. A flasher circuit for controlling power from a power source to a load at a predetermined periodic rate, comprising: oscillator means including a voltage supply, a voltage divider adapted to be connected to said voltage supply, a first transistor having a base, collector and emitter, the collector and emitter of said first transistor being adapted to be connected to said voltage supply, means connecting a point of said voltage divider to the base of said first transistor for biasing the same, a second transistor having a base, collector and emitter, the collector and emitter of said second transistor being adapted to be connected to said voltage supply, means connecting the emitter of said first transistor to the base of said second transistor, a third transistor having a base, collector and emitter, the collector and emitter of said third transistor being adapted to be connected to said voltage supply and the collector of said second transistor being adapted to be connected to the base of said third transistor, and a capacitor connecting the collector of said third transistor to the base of said first transistor whereby oscillation occurs and a signal on the emitter of said third transistor is varied at a periodic rate; and a fourth transistor having a base, collector and emitter, the emitter of said third transistor being connected to the base of said fourth transistor, the collector of said fourth transistor being connected to one end of a load, the other end of which and the emitter of said fourth transistor are connected to said voltage source, said fourth transistor being responsive to the variations of said signal for applying power to said load at said periodic rate.

10. Apparatus as in claim 9 wherein said voltage divider includes series connected resistors, and a thermistor is connected in parallel with one of said resistors whereby variation of the rate of oscillation of said oscillator means with variation of ambient temperature is prevented.

11. Apparatus as in claim 9 wherein feedback means including a resistor is connected between the collector of said third transistor and the emitter of said second transistor.

12. Apparatus as in claim 9 wherein said voltage divider includes series resistors, a thermistor is connected in parallel with one of said resistors, and a feedback resistor is connected between the collector of said third transistor and the emitter of said second transistor.

References Cited in the file of this patent

UNITED STATES PATENTS

| | | |
|---|---|---|
| 2,791,693 | Moore | May 7, 1957 |
| 2,953,752 | Porter | Sept. 20, 1960 |
| 2,972,706 | Malm | Feb. 21, 1961 |

OTHER REFERENCES

Publication "Flashlight With Transistors," Popular Electronics, September 1958, pages 75 and 76 relied on.